United States Patent
Kikawa et al.

(10) Patent No.: US 10,065,622 B2
(45) Date of Patent: Sep. 4, 2018

(54) VEHICLE CONTROL APPARATUS AND BRAKE CONTROL APPARATUS

(71) Applicant: HITACHI AUTOMOTIVE SYSTEMS, LTD., Ibaraki (JP)

(72) Inventors: Masayuki Kikawa, Kanagawa (JP); Daisuke Goto, Kanagawa (JP); Kentaro Ueno, Kanagawa (JP); Toshiyuki Innami, Ibaraki (JP); Tatsuji Ohkubo, Gunma (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 219 days.

(21) Appl. No.: 14/037,832

(22) Filed: Sep. 26, 2013

(65) Prior Publication Data

US 2014/0095044 A1    Apr. 3, 2014

(30) Foreign Application Priority Data

Sep. 28, 2012   (JP) ................................. 2012-218406

(51) Int. Cl.
    *B60T 17/22*        (2006.01)
    *B60T 7/04*         (2006.01)
    (Continued)

(52) U.S. Cl.
    CPC ............ *B60T 17/221* (2013.01); *B60T 7/042* (2013.01); *B60T 8/4077* (2013.01);
    (Continued)

(58) Field of Classification Search
    CPC . B60T 8/88; B60T 8/94; B60T 8/4081; B60T 13/74; B60T 17/221; B60T 7/042;
    (Continued)

(56) References Cited

U.S. PATENT DOCUMENTS 6,189,981 B1 *   2/2001   Niedermeier .................... 303/20
7,926,887 B2 *   4/2011   Ohkubo .................... 303/122.03
(Continued)

FOREIGN PATENT DOCUMENTS

CN       101367378       2/2009
JP        2011-73535      4/2011

OTHER PUBLICATIONS

English language translation of Office Action dated Apr. 5, 2017 in Chinese Patent Application No. 201310449458.0.

*Primary Examiner* — Adam D Tissot
*Assistant Examiner* — Aaron C Smith
(74) *Attorney, Agent, or Firm* — Wenderoth, Lind & Ponack, L.L.P.

(57) ABSTRACT

A second ECU determines whether or not there is an abnormality in a hydraulic-pressure sensor in a first cycle based on a detection value of the hydraulic-pressure sensor, and outputs a signal indicating a determination of an occurrence of the abnormality to a first ECU via a signal line when determining the occurrence of the abnormality in the hydraulic-pressure sensor. The first ECU receives the detection value of the hydraulic-pressure sensor through communication from the second ECU via the signal line to determine whether or not there is the abnormality in the hydraulic-pressure sensor in a second cycle that is shorter than the first cycle. When determining that the hydraulic-pressure sensor is abnormal, the first ECU controls driving of an electric actuator based on a braking command from an operation-amount detection sensor without using the detection value of the hydraulic-pressure sensor determined to be abnormal.

13 Claims, 3 Drawing Sheets

(51) Int. Cl.
 *B60T 13/14* (2006.01)
 *B60T 13/66* (2006.01)
 *B60T 13/68* (2006.01)
 *B60T 13/74* (2006.01)
 *B60T 8/40* (2006.01)

(52) U.S. Cl.
 CPC .......... *B60T 13/146* (2013.01); *B60T 13/662* (2013.01); *B60T 13/686* (2013.01); *B60T 13/745* (2013.01)

(58) Field of Classification Search
 CPC .... B60T 13/662; B60T 13/146; B60T 8/4077; B60T 13/745; B60T 13/686
 USPC .................... 701/70; 303/20, 122.03, 122.05
 See application file for complete search history.

(56) References Cited

U.S. PATENT DOCUMENTS

| | | |
|---|---|---|
| 8,007,056 B2 * | 8/2011 | Ohkubo et al. .......... 303/122.05 |
| 8,447,487 B2 | 5/2013 | Nishino et al. |
| 2009/0045672 A1 | 2/2009 | Nishino et al. |

\* cited by examiner

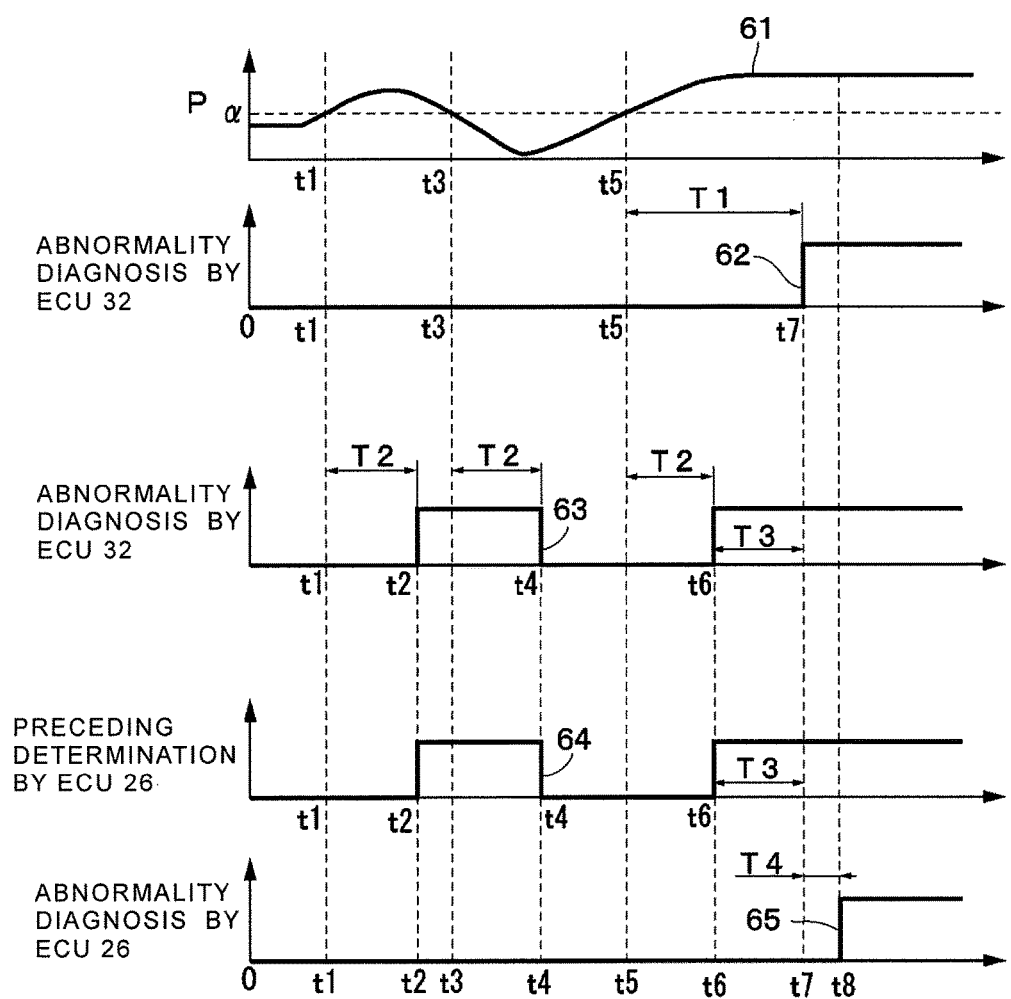

VEHICLE CONTROL APPARATUS AND BRAKE CONTROL APPARATUS

CROSS-REFERENCE TO RELATED APPLICATIONS

The present application claims priority to Japanese Patent Application No. 2012-218406 filed on Sep. 28, 2012. The entire disclosure of Japanese Patent Application No. 2012-218406 filed on Sep. 28, 2012 including the specification, claims, drawings and summary is incorporated herein by reference in its entirety.

BACKGROUND OF THE INVENTION

Field of the Invention

The present invention relates to a vehicle control apparatus and a brake control apparatus, which are suitably used for a vehicle, such as a four-wheeled automobile.

Description of the Related Art

A brake control apparatus, for example, which is mounted in a vehicle, such as a four-wheeled automobile, includes a master-cylinder pressure control apparatus (that is, a first braking mechanism), a first control circuit, a wheel-cylinder pressure control apparatus (that is, a second braking mechanism), and a second control circuit. The master-cylinder pressure control apparatus controls a master-cylinder pressure generated in a master cylinder by an electric actuator based on an amount of braking operation performed by a driver. The first control circuit electrically controls the driving of the electric actuator of the first braking mechanism. The wheel-cylinder pressure control apparatus is provided between a wheel cylinder for braking provided on each wheel side of the vehicle and the master cylinder to variably control the master-cylinder pressure generated by the first braking mechanism as a wheel-cylinder pressure for each wheel so as to individually supply the wheel-cylinder pressure to the wheel cylinder of each wheel. The second control circuit electrically controls the driving of the second braking mechanism (for example, see Japanese Patent Application Laid-open No. 2011-73535).

A hydraulic-pressure sensor for detecting the master-cylinder pressure generated in the master cylinder is provided between the first control circuit and the second control circuit. The first control circuit controls the driving of the electric actuator of the first braking mechanism based on a detection value of the hydraulic-pressure sensor, to thereby control the master-cylinder pressure, whereas the second control circuit controls the wheel-cylinder pressure for each wheel side by the second braking mechanism based on the detection value of the hydraulic-pressure sensor.

By the way, in the related art described above, the following configuration is used to reduce the number of sensors, such as the hydraulic-pressure sensor. Specifically, the detection signal obtained by the single hydraulic-pressure sensor is used both to control the master-cylinder pressure by the first control circuit and to control the wheel-cylinder pressure by the second control circuit. Because of the above-mentioned configuration, for example, even if an abnormality in the sensor is detected as a result of the determination of whether or not the detection signal of the hydraulic-pressure sensor is abnormal, which is made by the first control circuit, the second control circuit continues the control by using the detection signal of the hydraulic-pressure sensor in some cases. As a result, there arises a problem in that it is difficult to ensure reliability of the control.

SUMMARY OF THE INVENTION

In order to solve the above-mentioned problem, according to one aspect of the present invention, there is provided a vehicle control apparatus including: a first control circuit configured to control a first mechanism provided to a vehicle; a second control circuit configured to control a second mechanism provided to the vehicle; a detection device configured to be electrically connected to the second control circuit and configured to detect a state of the vehicle (an operation state, a kinetic state, and the like of the vehicle); and a signal line configured to electrically connect the first control circuit and the second control circuit to each other to allow communication of a detection signal of the detection device, in which: the second control circuit is configured to determine whether or not there is an abnormality in the detection device by a predetermined criterion based on a detection value of the detection device; and the first control circuit is configured to receive the detection value of the detection device through communication from the second control circuit via the signal line, and is configured to determine whether or not there is the abnormality in the detection device by another criterion different from the predetermined criterion of the second control circuit based on the detection signal received through the communication.

Further, according to one aspect of the present invention, there is provided a brake control apparatus including: a first control circuit configured to control a first braking mechanism for generating a braking force for a vehicle; a second control circuit configured to control a second braking mechanism for generating a braking force for the vehicle independently of the first braking mechanism; a hydraulic-pressure sensor configured to be electrically connected to the second control circuit and configured to detect a hydraulic pressure for calculating a braking force to be generated; and a signal line configured to electrically connecting the first control circuit and the second control circuit to each other to allow communication of a detection signal based on a detection value of the hydraulic-pressure sensor, in which: the second control circuit is configured to determine whether or not there is an abnormality in the hydraulic-pressure sensor based on the detection value of the hydraulic-pressure sensor; and the first control circuit is configured to receive the detection signal of the hydraulic-pressure sensor through communication from the second control circuit via the signal line, and is configured to determine whether or not there is the abnormality in the hydraulic-pressure sensor based on the detection signal received through the communication, at a time earlier than a time at which the second control circuit makes the determination.

BRIEF DESCRIPTION OF THE DRAWINGS

In the accompanying drawings:

FIG. 4 is a characteristic diagram showing determination of whether or not there is an abnormality in a sensor according to a second embodiment of the present invention;

DETAILED DESCRIPTION OF THE INVENTION

Now, a vehicle control apparatus and a brake control apparatus according to embodiments of the present invention will be specifically described referring to the accompanying drawings, taking a brake control apparatus to be mounted in a four-wheeled automobile as an example.

Figure 1:
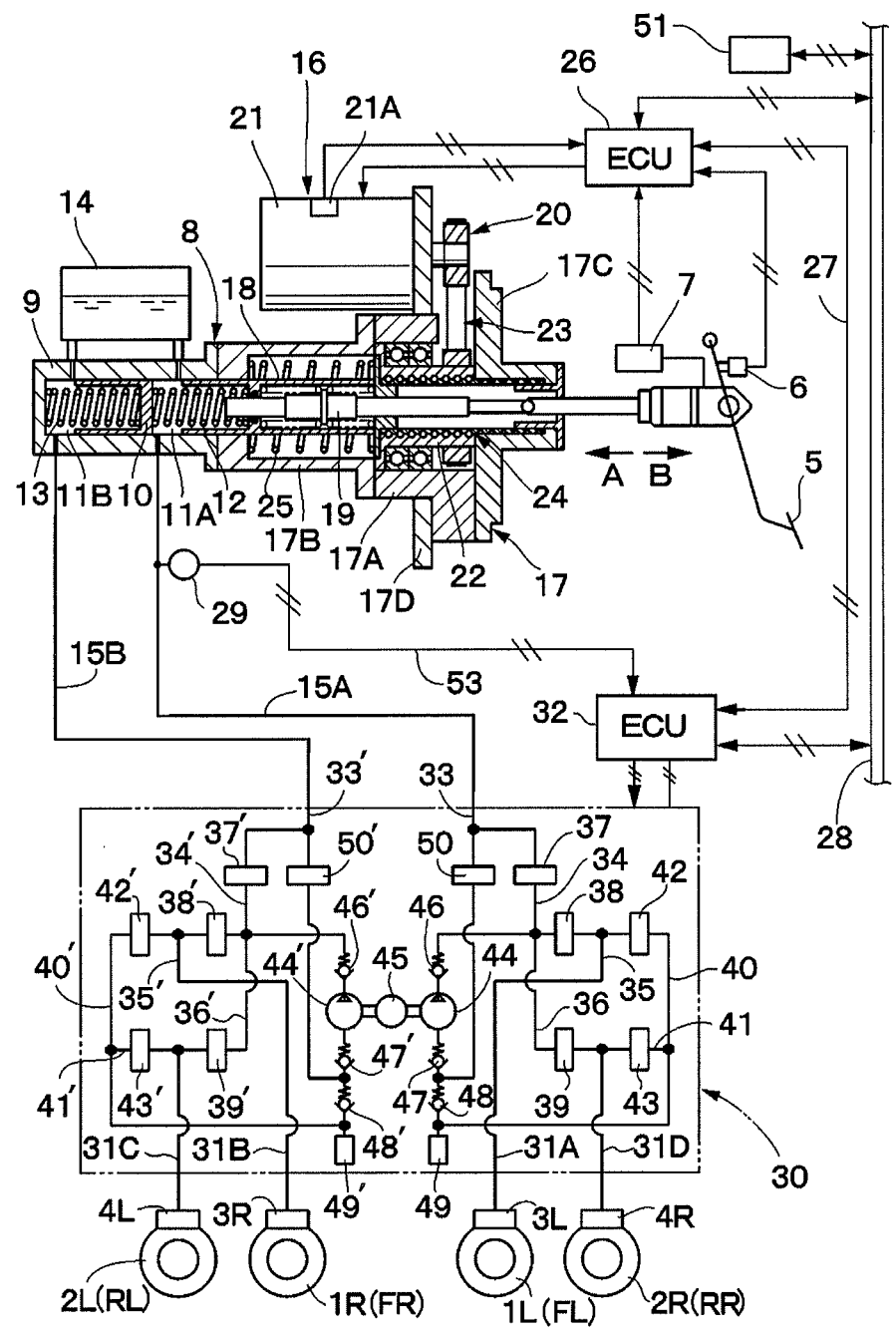
FIG. 1 is an overall configuration diagram illustrating a brake control apparatus as a vehicle control apparatus according to a first embodiment of the present invention.
Figure 2:
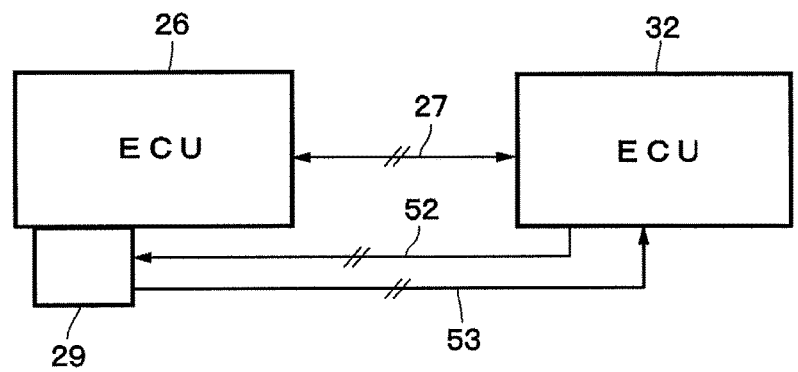
FIG. 2 is a circuit block diagram illustrating a wire connection relationship between two control circuits and a hydraulic-pressure sensor.
Figure 3:
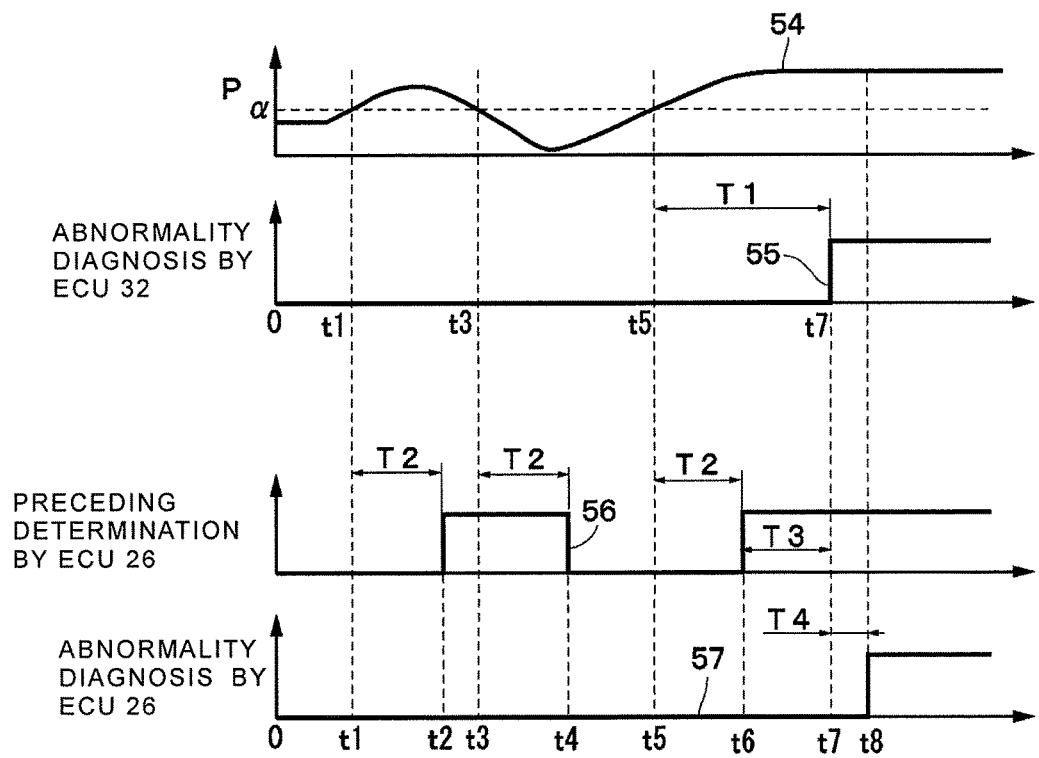
FIG. 3 is a characteristic diagram showing determination of whether or not there is an abnormality in a sensor according to the first embodiment of the present invention.

FIGS. 1 to 3 illustrate a brake control apparatus according to a first embodiment of the present invention. In FIG. 1, a right front wheel 1R, a left front wheel 1L, a right rear wheel 2R, and a left rear wheel 2L are provided to a lower side of a vehicle body (not shown) constituting a body of a vehicle. A front-wheel side wheel cylinder 3R is provided to the right front wheel 1R, whereas a front-wheel side wheel cylinder 3L is provided to the left front wheel 1L. Similarly, a rear-wheel side wheel cylinder 4R is provided to the right rear wheel 2R, whereas a rear-wheel side wheel cylinder 4L is provided to the left rear wheel 2L. The wheel cylinders 3R, 3L, 4R, and 4L are cylinders of a hydraulic disc brake or drum brake. Each of the wheel cylinders 3R, 3L, 4R, and 4L applies a braking force to each of the wheels (front wheels 1R and 1L and rear wheels 2R and 2L).

A brake pedal 5 is provided on a front board (not shown) side of the vehicle body. The brake pedal 5 is operated by a driver to be pedaled in a direction indicated by the arrow A shown in FIG. 1 at the time of a braking operation for the vehicle. The brake pedal 5 is provided with a brake switch 6 and an operation-amount detection sensor 7. The brake switch 6 detects whether or not the braking operation for the vehicle is performed, and turns on and off a brake lamp (not shown), for example. The operation-amount detection sensor 7 detects a pedaling-operation amount of the brake pedal 5 as a stroke amount, and outputs a detection signal to ECUs 26 and 32 and a vehicle data bus 28 described below. The pedaling operation of the brake pedal 5 is transmitted to a master cylinder 8 through an intermediation of a booster 16 which constitutes a part of an electric booster described below. Note that, in this embodiment, the operation-amount detection sensor 7 detects the stroke amount of the brake pedal 5 as the pedaling-operation amount on the brake pedal 5, the pedaling-operation amount to be detected by the operation-amount detection sensor 7 is not limited thereto. A pedaling force may be detected as the pedaling-operation amount of the brake pedal 5.

The master cylinder 8 includes a cylinder main body 9 having a cylindrical shape with a closed end. Specifically, the cylinder main body 9 has an open end on one side and a bottom portion on the other side. The open-end side of the cylinder main body 9 is removably firmly fixed to a booster housing 17 of the booster 16 described later by using a plurality of mounting bolts (not shown) or the like. The master cylinder 8 includes the cylinder main body 9, a first piston (including a booster piston 18 and an input piston 19 described later), a second piston 10, a first hydraulic chamber 11A, a second hydraulic chamber 11B, a first return spring 12, and a second return spring 13.

In this case, in the master cylinder 8, the first piston includes the booster piston 18 and the input piston 19 described below. The first hydraulic chamber 11A formed inside the cylinder main body 9 is defined between the second piston 10 and the booster piston 18 (and the input piston 19). The second hydraulic chamber 11B is defined inside the cylinder main body 9 between the bottom portion of the cylinder main body 9 and the second piston 10.

The first return spring 12 is located in the first hydraulic chamber 11A, and is provided between the booster piston 18 and the second piston 10 to bias the booster piston 18 toward the open-end side of the cylinder main body 9. The second return spring 13 is located in the second hydraulic chamber 11B, and is provided between the bottom portion of the cylinder main body 9 and the second piston 10 to bias the second piston 10 toward the first hydraulic chamber 11A.

When the booster piston 18 (input piston 19) and the second piston 10 inside the cylinder main body 9 displace toward the bottom portion of the cylinder main body 9 in accordance with the pedaling operation of the brake pedal, the master cylinder 8 generates a hydraulic pressure as a master-cylinder pressure by a brake fluid in the first hydraulic chamber 11A and the second hydraulic chamber 11B. On the other hand, in the case where the operation of the brake pedal is released, as the booster piston 18 (and the input piston 19) and the second piston 10 are displaced by the first return spring 12 and the second return spring 13 toward the opening portion of the cylinder main body 9 in a direction indicated by the arrow B, the cylinder main body 9 of the master cylinder 8 releases the hydraulic pressure in the first hydraulic chamber 11A and the second hydraulic chamber 11B while being supplied with the brake fluid from a reservoir 14.

The reservoir 14 which stores the brake fluid therein is provided as a working-fluid tank to the cylinder main body 9 of the master cylinder 8. The reservoir 14 supplies and discharges the brake fluid to and from the hydraulic chambers 11A and 11B inside the cylinder main body 9. The hydraulic pressure as the master-cylinder pressure generated in the first hydraulic chamber 11A and the second hydraulic chamber 11B of the master cylinder 8 is transmitted to an ESC 30 described later, which is a hydraulic-pressure supplying device, through, for example, a pair of cylinder-side hydraulic pipes 15A and 15B.

The booster 16 is provided as a part of the electric booster for increasing an operation force on the brake pedal 5 between the brake pedal 5 of the vehicle and the master cylinder 8. The booster 16 and the ECU 26 constitute the electric booster. Together with the master cylinder 8, the booster 16 forms a master-cylinder pressure control mechanism (that is, a first mechanism or a first braking mechanism). Specifically, the ECU 26 controls the driving of an electric actuator 20 described later based on the output from the operation-amount detection sensor 7, the master-cylinder pressure control mechanism controls the hydraulic pressure (that is, the master-cylinder pressure) generated in the master cylinder 8.

The booster 16 as the first braking mechanism includes the booster housing 17, the booster piston 18, and the electric actuator 20 described later. The booster housing 17 is provided so as to be fixed to a front wall of a vehicle interior (not shown), which is the front board of the vehicle body. The booster piston 18 is provided as a driving piston to the booster housing 17 so as to be movable (that is, movable forward and backward in an axial direction of the master cylinder 8). The electric actuator 20 applies a booster thrust to the booster piston 18.

The booster piston 18 is formed of a cylindrical member which is slidably inserted and fitted into the cylinder main body 9 of the master cylinder 8 from the open-end side in the axial direction. On the inner circumferential side of the booster piston 18, the input piston 19 is slidably inserted and fitted. The input piston 19 is formed of an axial member which is directly pressed in accordance with the operation of the brake pedal 5 so as to be moved forward and backward in the axial direction of the master cylinder 8 (that is, in directions indicated by the arrows A and B shown in FIG. 1). The input piston 19 constitutes the first piston of the master cylinder 8 together with the booster piston 18. Inside the cylinder main body 9, the first hydraulic chamber 11A is defined between the second piston 10, and the booster piston 18 and the input piston 19.

The booster housing 17 includes a speed-reducer case 17A having a cylindrical shape, a supporting case 17B having a cylindrical shape, and a lid body 17C having a cylindrical shape with a step. The speed-reducer case 17A houses a speed-reducer mechanism 23 described later therein. The supporting case 17B is provided between the speed-reducer case 17A and the cylinder main body 9 of the master cylinder 8, and supports the booster piston 18 so that the booster piston 18 is slidably displaceable in the axial direction. The lid body 17C is provided on the side opposite to the supporting case 17B in the axial direction through the speed-reducer case 17A therebetween, and closes an opening of the speed-reducer case 17A on one side in the axial direction. On the outer circumferential side of the speed-reducer case 17A, a support plate 17D for fixedly supporting an electric motor 21 described later is provided.

The input piston 19 is inserted from the lid body 17C side into the booster housing 17, and extends inside the booster piston 18 in the axial direction toward the first hydraulic chamber 11A. An end surface of the input piston 19 on a distal end side (another side in the axial direction) is subjected to the hydraulic pressure generated in the first hydraulic chamber 11A at the time of the brake operation as a brake reaction force. The input piston 19 transmits the generated hydraulic pressure to the brake pedal 5. As a result, an appropriate pedal feel is provided to the driver of the vehicle through the brake pedal 5. Thus, a good pedal feel (good braking) can be obtained. As a result, an operation feel of the brake pedal can be improved to maintain a good pedal feel.

The electric actuator 20 of the booster 16 includes the electric motor 21, the speed-reducer mechanism 23 such as a belt, and a linear-motion mechanism 24 such as a ball screw. The electric motor 21 is provided to the speed-reducer case 17A of the booster housing 17 through the supporting plate 17D therebetween. The speed-reducer mechanism 23 transmits the rotation of the electric motor 21 to a cylindrical rotary body 22 provided in the speed-reducer case 17A after reducing the speed of the rotation. The linear-motion mechanism 24 converts the rotation of the cylindrical rotary body 22 into an axial displacement (forward and backward movement) of the booster piston 18. The booster piston 18 and the input piston 19 respectively have front ends (ends on the other side in the axial direction) exposed in the first hydraulic chamber 11A of the master cylinder 8, and generate the brake fluid pressure in the master cylinder 8 by the pedaling force (thrust) transmitted from the brake pedal 5 to the input piston 19 and the booster thrust transmitted from the electric actuator 20 to the booster piston 18.

Specifically, the booster piston 18 of the booster 16 forms a pump mechanism which is driven by the electric actuator 20 based on the output from the operation-amount detection sensor 7 (that is, a braking command) to generate the brake fluid pressure (master-cylinder pressure) in the master cylinder 8. A return spring 25 for constantly biasing the booster piston 18 in a direction in which the braking is released (direction indicated by the arrow B shown in FIG. 1) is provided inside the supporting case 17B of the booster housing 17. At the time of release of the brake operation, the electric motor 21 is rotated in a reverse direction, while the booster piston 18 is returned to an initial position illustrated in FIG. 1 in the direction indicated by the arrow B by a biasing force of the return spring 25.

The electric motor 21 is formed by using, for example, a DC brushless motor. A rotation sensor 21A called "resolver" is provided to the electric motor 21. The rotation sensor 21A detects a position of rotation (rotation angle) of the electric motor 21 (motor shaft), and outputs a detection signal to a control unit which is a first control circuit (hereinafter referred to as "first ECU 26"). The first ECU 26 performs feedback control based on the rotation-position signal. The rotation sensor 21A has a function as a rotation detection device for detecting an absolute displacement of the booster piston 18 with respect to the vehicle body based on the detected position of rotation of the electric motor 21.

Further, together with the operation-amount detection sensor 7, the rotation sensor 21A constitutes a displacement detection device for detecting a relative displacement amount between the booster piston 18 and the input piston 19. The detection signals of the rotation sensor 21A and the operation-amount detection sensor 7 are transmitted to the first ECU 226. The rotation detection device is not limited to the rotation sensor 21A such as the resolver, but may also be a rotary potentiometer capable of detecting the absolute displacement (rotation angle). The speed-reducing mechanism 23 is not limited to the belt or the like, and may also be configured by using, for example, a gear speed-reduction mechanism or the like. The speed-reduction mechanism 23 is not indispensably provided. For example, the following configuration may be used. The motor shaft is provided to the cylindrical rotary body 22 so as to be integral therewith, and a stator of the electric motor is provided around the cylindrical rotary body 22. In this manner, the cylindrical rotary body 22 may be directly rotated by the electric motor.

The first ECU 26 is, for example, a microcomputer, and constitutes the first control circuit for electrically controlling the driving of the electric actuator 20 of the booster 16 which is the first braking mechanism. An input side of the first ECU 26 is connected to the operation-amount detection sensor 7 for detecting the operation amount of or the pedaling force on the brake pedal 5, the rotation sensor 21A of the electric motor 21, a signal line 27 mounted in the vehicle such as called "L-CAN", which is capable of performing communication, and the vehicle data bus 28 for feeding power and transmitting and receiving a signal from an ECU of another vehicle equipment. The vehicle data bus 28 is a serial communication unit called "V-CAN" which is mounted in the vehicle, and performs multiplex communication to be mounted in the vehicle. In FIG. 1, a line crossed by two diagonal lines indicates an electric-system line such as a signal line or a power wire.

A hydraulic-pressure sensor 29 as a detection device detects the hydraulic pressure in, for example, the cylinder-side hydraulic pipe 15A, and detects the brake fluid pressure to be supplied from the master cylinder 8 through the cylinder-side hydraulic pipe 15A to the ESC 30 described later. The hydraulic-pressure sensor 29 is electrically connected to a second ECU 32 described later. At the same time, a detection signal by the hydraulic-pressure sensor 29 is also transmitted through the communication to the first ECU 26 from the second ECU 32 via the signal line 27.

An output side of the first ECU 26 is connected to the electric motor 21, and the signal line 27 and the vehicle data bus 28 which are mounted in the vehicle. The first ECU 26 variably controls the brake fluid pressure to be generated in the master cylinder 8 by the booster 16 in accordance with the detection signals from the operation-amount detection sensor 7 and the hydraulic-pressure sensor 29, and also determines whether or not the booster 16 which constitutes a part of the first braking mechanism is operating normally.

Specifically, when the brake pedal 5 is operated, the input piston 19 moves forward toward the cylinder main body 9 of the master cylinder 8. The movement of the input piston 19 is detected by the operation-amount detection sensor 7. In response to the detection signal from the operation-amount detection sensor 7, the first ECU 26 outputs a start command to the electric motor 21 to rotationally drive the electric motor 21. The rotation of the electric motor 21 is transmitted to the cylindrical rotary body 22 through an intermediation of the speed-reducer mechanism 23. Then, the rotation of the cylindrical rotary body 22 is converted into the axial displacement of the booster piston 18 by the linear-motion mechanism 24 in the booster 16.

At this time, the booster piston 18 moves forward integrally with the input piston 19 toward the cylinder main body 9 of the master cylinder 8. As a result, the brake fluid pressure in accordance with the pedaling force (thrust) applied from the brake pedal 5 to the input piston 19 and the booster thrust applied from the electric actuator 20 to the booster piston 18 is generated in the first hydraulic chamber 11A and the second hydraulic chamber 11B of the master cylinder 8. By receiving the detection signal from the hydraulic-pressure sensor 29 via the signal line 27, the first ECU 26 can monitor the hydraulic pressure generated in the master cylinder 8, and therefore can determine whether or not the booster 16 is operating normally.

The hydraulic-pressure supply device 30 (also referred to as "ESC 30") as a second braking mechanism, which is provided between the wheel cylinders 3R, 3L, 4R, and 4L provide on the respective wheels (front wheels 1R and 1L and rear wheels 2R and 2L) of the vehicle, and the master cylinder 8 is now described.

The ESC 30 as the second braking mechanism constitutes a wheel-cylinder pressure control apparatus for variably controlling the hydraulic pressure as the master-cylinder pressure, which is generated in the master cylinder 8 (first hydraulic chamber 11A and second hydraulic chamber 11B) by the booster 16, as the wheel-cylinder pressure for each wheel and then individually supplying the wheel-cylinder pressure to each of the wheel cylinders 3R, 3L, 4R, and 4L for the respective wheels.

Specifically, the ESC 30 constitutes a brake assist apparatus. When the brake fluid pressure to be supplied from the master cylinder 8 through the cylinder-side hydraulic pipes 15A and 15B to the wheel cylinders 3R, 3L, 4R, and 4L is insufficient or various types of brake control (for example, braking-force distribution control for distributing a braking force to the front wheels 1R and 1L and the rear wheels 2R and 2L, anti-lock brake control, vehicle stabilization control, and the like) are performed, the ESC 30 supplies a necessary and sufficient brake fluid pressure obtained by compensation to the wheel cylinders 3R, 3L, 4R, and 4L.

The ESC 30 distributes and supplies the hydraulic pressure output from the master cylinder 8 (first hydraulic chamber 11A and second hydraulic chamber 11B) through the cylinder-side hydraulic pipes 15A and 15B to the wheels cylinders 3R, 3L, 4R, and 4L through brake-side pipe portions 31A, 31B, 31C, and 31D. In this manner, the independent braking force is applied to each of the wheels (front wheels 1R and 1L and rear wheels 2R and 2L) as described above. The ESC 30 includes control valves 37, 37', 38, 38', 39, 39', 42, 42', 43, 43', 50, and 50', and an electric motor 45 for driving hydraulic pumps 44 and 44'.

The second ECU 32 is a controller for the hydraulic-pressure supply device (ESC ECU) as a second control circuit for electrically controlling the driving of the ESC 30 (second braking mechanism). An input side of the second ECU 32 is connected to the hydraulic-pressure sensor 29, the signal line 27, and the vehicle data bus 28. An output side of the second ECU 32 is connected to the control valves 37, 37', 38, 38', 39, 39', 42, 42', 43, 43', 50, and 50', the electric motor 45, the signal line 27, and the vehicle data bus 28.

The second ECU 32 individually controls the driving of the control valves 37, 37', 38, 38', 39, 39', 42, 42', 43, 43', 50, and 50', and the electric motor 45 of the ESC 30 as described later. In this manner, the second ECU 32 performs control for reducing, maintaining, boosting, or applying the brake fluid pressure to be supplied from the brake-side pipe portions 31A to 31D to the wheel cylinders 3R, 3L, 4R, and 4L individually for the wheel cylinders 3R, 3L, 4R, and 4L.

Specifically, by controlling the actuation of the ESC 30, the second ECU 32 can execute, for example, the braking-force distribution control, the anti-lock brake control, the vehicle stabilization control, hill start aid control, traction control, vehicle tracking control, lane departure avoidance control, and obstacle avoidance control. The braking-force distribution control appropriately distributes the braking force to the respective wheels in accordance with a vertical load when the vehicle is braked. The anti-lock brake control prevents the wheels from being locked by automatically adjusting the braking force for each of the wheels at the time of braking. The vehicle stability control is to detect a skid of the wheels during running to suppress understeer and oversteer while appropriately automatically controlling the braking force to be applied to each of the wheels regardless of the operation amount of the brake pedal 5, thereby stabilizing a behavior of the vehicle. The hill start aid control assists in starting while maintaining a braked state on a hill (uphill, in particular). The traction control prevents the wheels from spinning at the time of start of the vehicle. The vehicle tracking control allows a constant distance to be kept from a vehicle ahead. The lane departure avoidance control allows the vehicle to run on a driving lane. The obstacle avoidance control avoids the collision against an obstacle ahead or behind the vehicle.

The ESC 30, which is the second braking mechanism (wheel-cylinder pressure control apparatus), includes two-system hydraulic circuits, that is, a first hydraulic system 33 and a second hydraulic system 33'. The first hydraulic system 33 is connected to one of output ports (that is, the cylinder-side hydraulic pipe 15A) of the master cylinder 8 to supply the hydraulic pressure to the wheel cylinder 3L for the left front wheel (FL) and the wheel cylinder 4R for the right rear wheel (RR). The second hydraulic system 33' is connected to the other output port (that is, the cylinder-side hydraulic pipe 15B) to supply the hydraulic pressure to the wheel cylinder 3R for the right front wheel (FR) and the wheel cylinder 4L for the left rear wheel (RL). The first hydraulic system 33 and the second hydraulic system 33' have the same configuration. Therefore, only the first hydraulic system 33 is described below. For the second hydraulic system 33', the reference symbols of the respective components are followed by the apostrophe "'", and the description thereof is herein omitted.

The first hydraulic system 33 of the ESC 30 includes a brake pipeline 34 connected to a distal end of the cylinder-side hydraulic pipe 15A. The brake pipeline 34 branches into a first pipeline portion 35 and a second pipeline portion 36, which are respectively connected to the wheel cylinders 3L and 4R. The brake pipeline 34 and the first pipeline portion 35 constitute a pipeline for supplying the hydraulic pressure to the wheel cylinder 3L together with the brake-side pipeline portion 31A, whereas the brake pipeline 34 and the second pipeline portion 36 constitute a pipeline for supplying the hydraulic pressure to the wheel cylinder 4R together with the brake-side pipeline portion 31D.

The brake fluid-pressure supply control valve 37 (hereinafter referred to simply as "supply control valve 37") is provided to the brake pipeline 34. The supply control valve 37 is a normally-open electromagnetic selector valve for opening and closing the brake pipeline 34. A boost control valve 38 is provided to the first pipeline portion 35. The boost control valve 38 is a normally-open electromagnetic selector valve for opening and closing the first pipeline portion 35. A boost control valve 39 is provided to the second pipeline portion 36. The boost control valve 39 is a normally-open electromagnetic valve for opening and closing the second pipeline portion 36.

On the other hand, the first hydraulic system 33 of the ESC 30 includes a first pressure-reduction pipeline 40 for connecting the wheel cylinder 3L side and a reservoir 49 for hydraulic-pressure control and a second pressure-reduction pipeline 41 for connecting the wheel cylinder 4R side and the reservoir 49. A first pressure-reduction control valve 42 is provided to the first pressure-reduction pipeline 40, whereas a second pressure-reduction control valve 43 is provided to the second pressure-reduction pipeline 41. The first pressure-reduction control valve 42 is a normally-closed electromagnetic selector valve for opening and closing the first pressure-reduction pipeline 40. Similarly, the second pressure-reduction control valve 43 is a normally-closed electromagnetic selector valve for opening and closing the second pressure-reduction pipeline 41.

The ESC 30 includes the hydraulic pump 44 as a hydraulic-pressure generation device which is a hydraulic-pressure source. The hydraulic pump 44 is rotationally driven by the electric motor 45. The electric motor 45 is driven by power fed from the second ECU 32. When the power feeding is stopped, the rotation of the electric motor 45 is stopped with the stop of the rotation of the hydraulic pump 44. A discharge side of the hydraulic pump 44 is connected to a portion of the brake pipeline 34, which is located on the downstream side of the supply control valve 37 (that is, at a position at which the first pipeline portion 35 and the second pipeline portion 36 branch) through a check valve 46. An intake side of the hydraulic pump 44 is connected to the reservoir 49 for hydraulic-pressure control through check valves 47 and 48.

The reservoir 49 for hydraulic-pressure control is provided to temporarily store an excessive brake fluid. The reservoir 49 for hydraulic-pressure control temporarily stores the excessive brake fluid flowing out from cylinder chambers (not shown) of the wheel cylinders 3L and 4R not only at the time of ABS control for the brake system (ESC 30) but also at the time of other brake control. The intake side of the hydraulic pump 44 is connected to the cylinder-side hydraulic pipe 15A of the master cylinder 8 (that is, to a portion of the brake pipeline 34, which is located on the upstream side of the supply control valve 37) through the check valve 47 and a pressurization control valve 50 which is a normally-closed electromagnetic selector valve.

For each of the control valves 37, 37', 38, 38', 39, 39', 42, 42', 43, 43', 50, and 50' and the electric motor 45 for driving the hydraulic pumps 44 and 44' that constitute the ESC 30, operation control is performed in a predetermined procedure in accordance with a control signal output from the second ECU 32.

Specifically, the first hydraulic system 33 of the ESC 30 directly supplies the hydraulic pressure generated in the master cylinder 8 by the booster 16 to the wheel cylinders 3L and 4R through the brake pipeline 34, the first pipeline portion 35, and the second pipeline portion 36 at the time of a normal operation based on the braking operation performed by the driver. For example, when antiskid control is to be executed, the boost control valves 38 and 39 are closed to maintain the hydraulic pressure in the wheel cylinders 3L and 4R. When the hydraulic pressure in the wheel cylinders 3L and 4R is to be reduced, the pressure-reduction control valves 42 and 43 are opened so that the hydraulic pressure in the wheel cylinders 3L and 4R is exhausted to be released to the reservoir 49 for hydraulic-pressure control.

When the hydraulic pressure to be supplied to the wheel cylinders 3L and 4R is to be boosted for stabilization control (electronic stability control) during running of the vehicle, the hydraulic pump 44 is actuated by the electric motor 45 in a state in which the supply control valve 37 is closed. In this manner, the brake fluid discharged from the hydraulic pump 44 is supplied to the wheel cylinders 3L and 4R through the first pipeline portion 35 and the second pipeline portion 36, respectively. At this time, the pressurization control valve 50 is opened. As a result, the brake fluid stored in the reservoir 14 is supplied from the master cylinder 8 side to the intake side of the hydraulic pump 44.

As described above, the second ECU 32 controls the actuation of the supply control valve 37, the boost control valves 38 and 39, the pressure-reduction control valves 42 and 43, the pressurization control valve 50, and the electric motor 45 (that is, the hydraulic pump 44) based on vehicle operation information so as to appropriately maintain, reduce, or boost the hydraulic pressure to be supplied to the wheel cylinders 3L and 4R. As a result, the above-mentioned brake control such as the braking-force distribution control, the vehicle stabilization control, the brake assist control, the antiskid control, the traction control, and the hill start aid control is executed.

On the other hand, in a normal braking mode which is effected in a state in which the electric motor 45 (that is, the hydraulic pump 44) is stopped, the supply control valve 37 and the boost control valves 38 and 39 are opened, whereas the pressure-reduction valves 42 and 43 and the pressurization control valve 50 are closed. In this state, when the first piston (that is, the booster piston 18 and the input piston 19) and the second piston 10 of the master cylinder 8 displace in the axial direction inside the cylinder main body 9 in accordance with the pedaling operation of the brake pedal 5, the brake fluid pressure generated in the first hydraulic chamber 11A is supplied from the cylinder-side hydraulic pipe 15A side through the first hydraulic system 33 and the brake-side pipe portions 31A and 31D of the ESC 30 to the wheel cylinders 3L and 4R. The brake fluid pressure generated in the second hydraulic chamber 11B is supplied from the cylinder-side hydraulic pipe 15B side through the second hydraulic system 33' and the brake-side pipe portions 31B and 31C to the wheel cylinders 3R and 4L.

In a brake assist mode which is effected when the brake fluid pressure generated in the first hydraulic chamber 11A and the second hydraulic chamber 11B (that is, the hydraulic pressure in the cylinder-side hydraulic pipe 15A, which is detected by the hydraulic-pressure sensor 29) is insufficient, the pressurization control valve 50 and the boost control valves 38 and 39 are opened, while the supply control valve 37 and the pressure-reduction control valves 42 and 43 are appropriately opened and closed. In this state, the hydraulic pump 44 is actuated by the electric motor 45 so that the brake fluid discharged from the hydraulic pump 44 is supplied to the wheel cylinders 3L and 4R through the first pipeline portion 35 and the second pipeline portion 36, respectively. In this manner, together with the brake fluid pressure generated on the master cylinder 8 side, the braking force by the wheel cylinders 3L and 4R can be generated by the brake fluid discharged from the hydraulic pump 44.

A known hydraulic pump, such as a plunger pump, a trochoid pump, and a gear pump can be used as the hydraulic pump 44. In view of adaptability to vehicle installation, quietness, and pump efficiency, the use of the gear pump is desired. A known motor, such as a DC motor, a DC brushless motor, and an AC motor can be used as the electric motor 45. In this embodiment, the DC motor is used in view of adaptability to vehicle installation.

Characteristics of the control valves 37, 38, 39, 42, 43, and 50 of the ESC 30 can be appropriately set in accordance with a mode of use of each of the control valves. Among the above-mentioned control valves, the supply control valve 37 and the boost control valves 38 and 39 are configured as the normally-open valves, whereas the pressure-reduction control valves 42 and 43 and the pressurization control valve 50 are configured as the normally-closed valves. As a result, even when there is no control signal transmitted from the second ECU 32, the hydraulic pressure can be supplied from the master cylinder 8 to the wheel cylinders 3R, 3L, 4R, and 4L. Therefore, in view of fail safe and control efficiency of the brake apparatus, the use of the above-mentioned configuration is desired.

A regenerative cooperation control device 51 for power charge is connected to the vehicle data bus 28 mounted in the vehicle. The regenerative cooperation control device 51 uses an inertia force generated by the rotation of each of the wheels at the time of deceleration and braking of the vehicle to control the driving of an electric generator (not shown). In this manner, the regenerative cooperation control device 51 collects kinetic energy as electric power. The regenerative cooperation control device 51 is connected to the first ECU 26 and the second ECU 32 through the vehicle data bus 28.

Next, referring to FIG. 2, a wire connection relationship between the first ECU 26, the second ECU 32, and the hydraulic-pressure sensor 29 is described. The hydraulic-pressure sensor 29 is fixedly provided on the booster 16 side, more specifically, to the master cylinder 8, and is fed with power from the second ECU 32 through a power-supply line 52. As the detection signal of the hydraulic-pressure sensor 29, a measured value of the master-cylinder pressure is output in an analog value to the second ECU 32 via signal line 53. Then, the second ECU 32 digitally converts the detection signal from the hydraulic-pressure sensor 29 in constant control cycles. On the other hand, the first ECU 26 receives the detection signal digitally converted by the second ECU 32 as a communication signal via the signal line 27 which is a communication line. In this manner, the first ECU 26 can detect (monitor) the hydraulic pressure as the master-cylinder pressure generated in the hydraulic chamber 11A of the master cylinder 8 and the cylinder-side hydraulic pipe 15A.

FIG. 3 is a characteristic diagram showing determinations of whether or not there is an abnormality in the hydraulic-pressure sensor 29. The determinations are made when the brake pedal 5 is not operated and the booster 16 is not actuated to generate the hydraulic pressure, that is, in a state in which the master-cylinder pressure is not generated. A characteristic line 54 shown in FIG. 3 represents the detection signal output from the hydraulic-pressure sensor 29 as a hydraulic-pressure value P. When the hydraulic-pressure value P is equal to or smaller than a predefined abnormality threshold value $\alpha$, it is determined that the detection value of the hydraulic-pressure sensor 29 is normal. When the hydraulic-pressure value P exceeds the abnormality threshold value $\alpha$, it is determined that an abnormality has occurred. The characteristic line 54 shows that the hydraulic-pressure value P of the hydraulic-pressure sensor 29 is normal in the range of from a time 0 to a time t1 and the range of from a time t3 to a time t5, and the hydraulic-pressure value P of the hydraulic-pressure sensor 29 is abnormal in the range of from the time t1 to the time t3 and on and after the time t5. The abnormality threshold value $\alpha$ is set so as to determine if the detection signal is output although the master-cylinder pressure is not generated. The abnormality threshold value $\alpha$ is set to about a half of a maximum output value of the hydraulic-pressure sensor 29 in view of individual variability or a temperature drift of the hydraulic-pressure sensor 29.

The second ECU 32 determines whether or not there is an abnormality in the hydraulic-pressure sensor 29 in a predetermined first cycle T1 based on the detection value of the hydraulic-pressure sensor 29. Then, when the hydraulic-pressure value P exceeding the abnormality threshold value $\alpha$ is continuously output over the first cycle T1 as indicated by a characteristic line 55 shown in FIG. 3, the second ECU 32 determines the occurrence of the sensor abnormality at a time t7 and outputs a signal indicating the determination of occurrence of the abnormality via the signal line 27 to the first ECU 26. The first cycle T1 is set as a time period for determining whether or not the hydraulic-pressure value P is being stably output, and is set to, for example, about 500 ms. The first cycle T1 is set to a time period significantly longer than control cycles of the ECUs 26 and 32 and a cycle of communication between the ECU 26 and the ECU 32.

On the other hand, the first ECU 26 receives the detection value of the hydraulic-pressure sensor 29 through the communication via the signal line 27 from the second ECU 32 so as to determine whether or not there is an abnormality in the hydraulic-pressure sensor 29 in a second cycle T2 shorter than the first cycle T1, based on the detection signal received through the communication. Then, when the hydraulic-pressure value P exceeding the abnormality threshold value is continuously output over the second cycle T2, as indicated by a characteristic line 56 shown in FIG. 3, the first ECU 26 precedingly determines at a time t2 that there is an abnormality in the hydraulic-pressure sensor 29. At this time, complementary processing described below based on the preceding determination of the abnormality is performed. The result of the preceding determination may also be transmitted from the first ECU 26 via the signal line 27 to the second ECU 32.

In the complementary processing, the first ECU 26 controls the driving of the electric actuator 20 based on the detection signal (braking command) from the operation-amount detection sensor 7 without using the detection value from the hydraulic-pressure sensor 29 determined as abnormal. Similarly to the first cycle T1, each of the second cycles T2 is set to a time period significantly longer than the control cycle of the ECUs 26 and 32 and the cycle of communication between the ECUs 26 and 32. The reason why the second cycle T2 is set shorter than the first cycle T1 is as follows. The first cycle T1 is set as the time period for determining whether or not the hydraulic-pressure value P is being stably output, as described above. However, when there is even a small abnormality in the hydraulic-pressure value P used to control the first ECU 26, the driving of the electric actuator 20 cannot be controlled with high accuracy. Therefore, the second cycle T2 is set shorter so as to detect the abnormality in the hydraulic-pressure sensor 29 as quickly as possible.

As described above, in this embodiment, the first cycle T1 is set in the second ECU 32 as a predetermined criterion for the determination of occurrence of the abnormality in the hydraulic-pressure sensor 29, whereas the second cycle T2 shorter than the first cycle T1 is set in the first ECU 26 as another criterion for the determination of occurrence of the abnormality in the hydraulic-pressure sensor 29. In other words, the first ECU 26 determines whether or not there is the abnormality in the hydraulic-pressure sensor 29 at the time earlier than the time of determination made by the second ECU 32.

Thereafter, when the hydraulic-pressure value P indicated by the characteristic line 54 is reduced to the abnormality threshold value α or lower at a time t3, the preceding determination of occurrence of the abnormality in the hydraulic-pressure sensor 29 by the first ECU 26 is stopped at a time t4 when a time period in which the hydraulic-pressure P is equal to or smaller than the abnormality threshold value α exceeds the second cycle T2. Then, the first ECU 26 precedingly determines that the detection value of the hydraulic-pressure sensor 29 is normal. Therefore, on and after the time t4 (until a time t6 described below), the complementary processing is stopped. The first ECU 26 controls the driving of the electric actuator 20 based on both the detection signal of the operation-amount detection sensor 7 and the detection signal of the hydraulic-pressure sensor 29.

Thereafter, the characteristic line 54 exceeds the abnormality threshold value α again at the time t5. Then, at the time t6 when a time period in which the hydraulic-pressure value P indicated by the characteristic line 54 is larger than the abnormality threshold value α exceeds the second cycle T2, the first ECU 26 makes the preceding determination for the occurrence of the abnormality. As indicated by the characteristic line 56, the first ECU 26 starts the complementary processing based on the preceding determination of occurrence of the abnormality at the time t6, as described above. After elapse of a differential interval T3 between the first cycle T1 and the second cycle T2, which corresponds to a time period from the time t6 to the time t7, the second ECU 32 determines the occurrence of the sensor abnormality at the time t7 as described above, and then stores a fault code in the ECU or an external memory and makes a notification of the sensor abnormality by using an alarm lamp (not shown). Further, the second ECU 32 outputs a signal indicating the determination of occurrence of the abnormality to the first ECU 26 via the signal line 27. Then, as indicated by a characteristic line 57 shown in FIG. 3, the first ECU 26 determines the occurrence of the abnormality in the hydraulic-pressure sensor 29 at a time t8 at which a predetermined time period T4 required for communication and analysis of the communication signal after the determination of the occurrence of the abnormality elapses. The first ECU 26 also stores a fault code of the sensor in the ECU or an external memory, and at the same time, makes a notification of the sensor abnormality by using an alarm lamp or another alarm lamp (not shown).

The brake control apparatus according to the first embodiment has the configuration described above. The actuation of the brake control apparatus is now described.

First, when the driver of the vehicle performs the pedaling operation of the brake pedal 5, the input piston 19 is pressed in the direction indicated by the arrow A. At the same time, the actuation of the electric actuator 20 for the booster 16 is controlled by the first ECU 26. Specifically, the first ECU 26 outputs a start command to the electric motor 21 in response to the detection signal output from the operation-amount detection sensor 7 to rotationally drive the electric motor 21. The rotation of the electric motor 21 is transmitted to the cylindrical rotary body 22 through an intermediation of the speed-reducer mechanism 23. Then, the rotation of the cylindrical rotary body 22 is converted into the axial displacement of the booster piston 18 by the linear-motion mechanism 24.

As a result, the booster piston 18 for the booster 16 moves forward integrally with the input piston 19 toward the interior of the cylinder main body 9 of the master cylinder 8. The brake fluid pressure in accordance with the pedaling force (thrust) applied from the brake pedal 5 to the input piston 19 and the booster thrust applied from the electric actuator 20 to the booster piston 18 is generated in the first hydraulic chamber 11A and the second hydraulic chamber 11B of the master cylinder 8.

The first ECU 26 receives the detection value from the hydraulic-pressure sensor 29 as the communication signal via the signal line 27 to monitor the hydraulic pressure generated in the master cylinder 8. In this manner, the first ECU 26 performs feedback control on the electric actuator 20 of the booster 16 (rotation of the electric motor 21). In this manner, the brake fluid pressure generated in the first hydraulic chamber 11A and the second hydraulic chamber 11B of the master cylinder 8 can be variably controlled in accordance with the amount of the pedaling operation of the brake pedal 5. The first ECU 26 can determine whether or not the booster 16 (electric booster device) is operating normally in accordance with the detection value of the operation-amount detection sensor 7 and the detection value of the hydraulic-pressure sensor 29.

On the other hand, the input piston 19, which is coupled to the brake pedal 5, is subjected to the pressure generated in the first hydraulic chamber 11A and transmits the pressure as the brake reaction force to the brake pedal 5. As a result, a firm pedal feel can be provided to the driver of the vehicle through the input piston 19. As a result, the operation feel of the brake pedal 5 can be improved to keep a good pedal feel.

Next, the ESC 30 provided as the second braking mechanism between the wheel cylinders 3R, 3L, 4R, and 4L for the respective wheels (front wheels 1R and 1L and rear wheels 2R and 2L) and the master cylinder 8 distributes and supplies the hydraulic pressure generated by the booster 16 as the master-cylinder pressure in the master cylinder 8 (first hydraulic chamber 11A and second hydraulic chamber 11B) from the cylinder-side hydraulic pipes 15A and 15B through the hydraulic systems 33 and 33' and the brake-side pipe portions 31A, 31B, 31C, and 31D included in the ESC 30 to the wheel cylinders 3R, 3L, 4R, and 4L as the wheel-cylinder pressures for the respective wheels while variably controlling the hydraulic pressure. As a result, an appropriate braking force is applied to each of the wheels (front wheels 1R and 1L and rear wheels 2R and 2L) of the vehicle through each of the wheel cylinders 3R, 3L, 4R, and 4L.

The second ECU 32 for controlling the ESC 30 can receive the detection signal from the operation-amount detection sensor 7 via the signal line 27. In this case, the amount of the pedaling operation of the brake pedal 5 can be monitored. Then, when the brake is operated, the second ECU 32 receives the detection signal from the operation-amount detection sensor 7 through the communication. As a result, the control signal can be output from the second ECU 32 to the electric motor 45 to actuate the hydraulic pumps 44 and 44'. At the same time, by selectively opening and closing the control valves 37, 37', 38, 38', 39, 39', 42, 42', 43, 43', 50, and 50', the hydraulic pressures of the wheel cylinders 3R, 3L, 4R, and 4L can be controlled.

Therefore, when the vehicle is braked, the brake fluid pressures to be supplied from the master cylinder 8 (and/or the hydraulic pumps 44 and 44') respectively to the wheel cylinders 3R, 3L, 4R, and 4L in accordance with the pedaling operation of the brake pedal 5 can be individually boosted, maintained, or reduced. As a result, the brake fluid pressures corresponding to the pedaling operation of the brake pedal 5 and the operating state of the vehicle can be supplied to the wheel cylinders 3R, 3L, 4R, and 4L. At the same time, the braking force of the vehicle can be controlled with high accuracy.

As described above, according to the first embodiment, the hydraulic-pressure sensor 29 for detecting the hydraulic pressure generated in the hydraulic chamber 11A of the master cylinder 8 (cylinder-side hydraulic pipe 15A) is fixedly provided on the booster 16 side. The hydraulic-pressure sensor 29 is configured so that power is fed from the second ECU 32 through the power-supply line 52 and the detection signal from the hydraulic-pressure sensor 29 is output to the second ECU 32 via the signal line 53. Then, the second ECU 32 determines whether or not there is an abnormality in the hydraulic-pressure sensor 29 in the predetermined first cycle T1 based on the detection value of the hydraulic-pressure sensor 29. When, for example, the occurrence of the sensor abnormality is determined at the time t7 as indicated by the characteristic line 55 shown in FIG. 3, the signal indicating the determination of occurrence of the abnormality is output to the first ECU 26 via the signal line 27.

On the other hand, the first ECU 26 receives the detection value of the hydraulic-pressure sensor 29 from the ECU 32 via the signal line 27 through the communication, and then determines whether or not there is an abnormality in the hydraulic-pressure sensor 29 in the second cycles T2 based on the detection signal received through the communication. Then, over the time period in which it is determined that the detection value of the hydraulic-pressure sensor 29 is normal, the first ECU 26 can control the driving of the electric actuator 20 based on both the detection signal of the operation-amount detection sensor 7 and the detection signal of the hydraulic-pressure sensor 29.

When it is determined that the hydraulic-pressure sensor 29 is abnormal as indicated by the times t2 and t6 of the characteristic line 56 shown in FIG. 3, the first ECU 26 performs the complementary processing based on the preceding determination of occurrence of the abnormality. As a result, the first ECU 26 can control the driving of the electric actuator 20 based on the detection signal (braking command) from the operation-amount detection sensor 7 without using the detection value of the hydraulic-pressure sensor 29 which is determined as abnormal. Then, when the second ECU 32 determines the occurrence of the sensor abnormality at, for example, the time t7 because the duration of the abnormal state of the hydraulic-pressure sensor 29 exceeds the first cycle T1, the first ECU 26 determines the occurrence of the abnormality in the hydraulic-pressure sensor 29 at, for example, the time t8.

Therefore, according to the first embodiment, the first ECU 26 and the second ECU 32 can individually determine whether or not there is an abnormality in the hydraulic-pressured sensor 29. As a result, the reliability of the control performed for each of the control circuits (that is, the first ECU 26 and the second ECU 32) can be ensured.

In the first embodiment, the first cycle T1 is set as the predetermined criterion of the determination of whether or not there is an abnormality in the hydraulic-pressure sensor 29, which is used in the second ECU 32. As the other criterion of the determination of whether or not there is an abnormality in the hydraulic-pressure sensor 29, which is used in the first ECU 26, the second cycle T2 which is shorter than the first cycle T1 is set. However, as long as the first ECU 26 is set so as to determine whether or not there is an abnormality in the hydraulic-pressure sensor 29 at the time earlier than the determination of occurrence of the abnormality made by the second ECU 32, an abnormality of the hydraulic-pressure value P may be determined based on an abnormality threshold value $\alpha1$ which is smaller than the abnormality threshold value $\alpha$ as another criterion of the determination of whether or not there is an abnormality in the hydraulic-pressure sensor 29, which is used in the first ECU 26. In this case, when the first ECU 26 is configured to determine the occurrence of the abnormality in the hydraulic-pressure sensor 29 earlier than the second ECU 32, the second cycle T2 may be set to the same value as or a different value from the value of the first cycle T1.

Next, FIG. 4 shows a second embodiment of the present invention. The second embodiment has such a feature that whether or not the sensor signal value is abnormal is determined by the second control circuit and the first control circuit performs control based on a signal received from the second control circuit through communication. In the second embodiment, the same components as those in the first embodiment described above are denoted by the same reference symbols, and the description thereof is herein omitted.

FIG. 4 shows abnormality determination processing for the hydraulic-pressure sensor 29, which is performed by the first and second control circuits (that is, the first ECU 26 and the second ECU 32) used in the second embodiment. A characteristic line 61 shown in FIG. 4 represents the detection signal output from the hydraulic-pressure sensor 29 as the hydraulic-pressure value P. When the hydraulic-pressure value P is equal to or smaller than the abnormality threshold value $\alpha$, it is determined that the detection value of the hydraulic-pressure sensor 29 is normal. When the hydraulic-pressure value P exceeds the abnormality threshold value $\alpha$, it is determined that an abnormality has occurred. The characteristic line 61 shows that the detection value of the hydraulic-pressure sensor 29 is normal in the range of from the time 0 to the time t1 and the range of from the time t3 to the time t5, and the detection value of the hydraulic-pressure sensor 29 is abnormal in the range of from the time t1 to the time t3 and on and after the time t5.

The second ECU 32 determines whether or not there is an abnormality in the hydraulic-pressure sensor 29 in the predetermined first cycle T1 based on the detection value of the hydraulic-pressure sensor 29, as indicated by a characteristic line 62 shown in FIG. 4. The second ECU 32 precedingly determines whether or not there is an abnormality in the hydraulic-pressure sensor 29 in the second cycle T2 which is shorter than the first cycle, as indicated by a characteristic line 63 shown in FIG. 4. When the hydraulic-pressure value P exceeds the abnormality threshold value $\alpha$ at the time t1 and the preceding determination made by the second ECU 32 is established as the determination of occurrence of the sensor abnormality at the time t2 after elapse of the second cycle T2 from the occurrence of the abnormality, the second ECU 32 transmits the result of the preceding determination as an abnormality signal to the first ECU 26 via the signal line 27. With the above-mentioned preceding determination of whether or not there is an abnormality in the hydraulic-pressure sensor 29, the second ECU 32 precedingly determines whether or not there is an abnormality in the circuits other than the hydraulic-pressure sensor 29 (for example, an abnormality in the second ECU 32) in the second cycles T2. When the preceding determination made by the second ECU 32 is established as the determination of occurrence of the circuit abnormality, the second ECU 32 transmits the result of the preceding determination as an abnormality signal to the first ECU 26 via the signal line 27.

The preceding determination of whether or not there is an abnormality in the circuits other than the hydraulic-pressure sensor 29 is performed for the following reason. When there is an abnormality in any one of the circuits other than the hydraulic-pressure sensor 29, the hydraulic-pressure value P of the communication signal transmitted to the first ECU 26 sometimes differs from an actual hydraulic-pressure value even when there is no abnormality in the hydraulic-pressure sensor 29. In such a case, the circuit abnormality is transmitted as the abnormality signal to the first ECU 26 so as not to prevent the driving of the electric actuator 20 from being controlled with good accuracy.

When receiving the result of the preceding determination from the second ECU 32 as indicated by a characteristic line 64, the first ECU 26 performs the same complementary processing as that described in the first embodiment. By the complementary processing, the first ECU 26 controls the driving of the electric actuator 20 based on the detection signal (braking command) from the operation-amount detection sensor 7 without using the detection value of the hydraulic-pressure sensor 29 which is determined as abnormal.

Thereafter, the hydraulic-pressure value P becomes equal to or smaller than the abnormality threshold value α at the time t3. Then, when the time period in which the hydraulic-pressure value P is continuously equal to or smaller than the abnormality threshold value α exceeds the second cycle T2 at the time T4, the preceding determination made by the second ECU 32 is not established as indicated by the characteristic line 63. By receiving the result indicating that the preceding determination is not established, the first ECU 26 determines again that the detection value of the hydraulic-pressure sensor 29 is normal, as indicated by the characteristic line 64. Therefore, on and after the time t4 (until the time t6 described below), the complementary processing is stopped. The first ECU 26 controls the driving of the electric actuator 20 based on both the detection signal of the operation-amount detection sensor 7 and the detection signal of the hydraulic-pressure sensor 29.

However, when the sensor abnormality occurs again at the time t5 and the preceding determination of the sensor abnormality is then established at the time t6 as in the case described above, the first ECU 26 receives the result of the preceding determination from the second ECU 32 and performs the complementary processing. Then, when a time period in which an abnormality occurrence state lasts exceeds the first cycle T1 at the time t7, the second ECU 32 determines the occurrence of an abnormality because the detection value of the hydraulic-pressure sensor 29 is abnormal, as indicated by the characteristic line 62. A fault code of the sensor is stored in the second ECU 32. At the same time, a notification of the sensor abnormality is made by using an alarm lamp (not shown).

As described above, when determining the occurrence of the sensor abnormality at the time t7, the second ECU 32 outputs a signal indicating the determination of occurrence of the abnormality to the first ECU 26 via the signal line 27. Then, at the time t8 at which the predetermined time period T4 elapses from the determination of occurrence of the abnormality, the first ECU 26 determines the occurrence of the abnormality in the hydraulic-pressure sensor 29 as indicated by a characteristic line 65. A fault code of the sensor is stored in the first ECU 26. At the same time, a notification of the sensor abnormality is made by using another alarm lamp (not shown).

As described above, even in the second embodiment configured as described above, whether or not there is an abnormality in the hydraulic-pressure sensor 29 can be determined by the first ECU 26 and the second ECU 32. As in the case of the first embodiment, the reliability of the control for each of the control circuits (that is, the ECUs 26 and 32) can be ensured.

In the second embodiment described above, the preceding determination by the second ECU 32 is configured to be made based on the determination of whether or not there is an abnormality in the hydraulic-pressure sensor 29 in the second cycles T2, each of which is shorter than the first cycle T1, by using the common abnormality threshold value α. However, similarly to the preceding determination by the first ECU 26 described in the first embodiment, the preceding determination by the second ECU 32 may also be configured to be made based on the determination of whether or not the hydraulic-pressure value P is abnormal by using the abnormality threshold value α1 smaller than the abnormality threshold value α. In this case, when the preceding determination by the abnormality threshold value α1 is configured to determine the occurrence of the abnormality in the hydraulic-pressure sensor 29 earlier than the determination by the abnormality threshold value α, the second cycle T2 may be set to the same value as or a different value from the value of the first cycle T1.

In each of the embodiments described above, the case where the vehicle control apparatus is applied to the brake control apparatus to be mounted in the four-wheeled automobile has been described as an example. However, the present invention is not limited to the case described above. For example, as in the case where the hydraulic-pressure supply device (ESC 30) and an engine control apparatus share a detection value of a wheel-speed sensor, the present invention is applicable to vehicle control apparatuses other than the brake control apparatus.

Moreover, in the embodiments described above, the first ECU 26 (first control circuit) and the second ECU 32 (second control circuit) may be configured to mutually receive and transmit the result of determination of whether or not there is an abnormality in the hydraulic-pressure sensor 29 through the communication via the signal line 27 so as to independently perform the processing after the determination of occurrence of the abnormality.

As described above in the embodiments, according to the vehicle control apparatus of the embodiments described above, the first control circuit and the second control circuit are configured to individually perform the processing after the determination of occurrence of the abnormality. According to the vehicle control apparatus of the embodiments described above, there is such a feature that the first control circuit stops the control based on the detection signal of the detection device when the occurrence of the abnormality in the detection device is determined by the first or second control circuit. Moreover, a warning of the occurrence of the abnormality is not issued when the occurrence of the abnormality in the detection device is determined by the first control circuit, whereas a warning of the occurrence of the abnormality is issued when the occurrence of the abnormality in the detection device is determined by the second control circuit.

On the other hand, according to the brake control apparatus of one embodiment, the first control circuit is configured to control the first braking mechanism based on the braking command to the first braking mechanism and the detection value of the hydraulic-pressure sensor when detecting that there is no abnormality in the hydraulic-pressure sensor and to control the first braking mechanism based on the braking command (without using the detection value of the hydraulic-pressure sensor) when detecting the occurrence of the abnormality in the hydraulic-pressure sensor. The brake control apparatus of the present invention is configured to also detect whether or not there is an abnormality in the hydraulic-pressure sensor by the second control circuit and to determine a failure of the hydraulic-pressure sensor when the abnormality is detected.

Further, the brake control apparatus according to the present invention includes the first control circuit for controlling the first braking mechanism for generating the braking force for the vehicle, the second control circuit for controlling the second braking mechanism for generating the braking force for the vehicle independently of the first braking mechanism, the hydraulic-pressure sensor electrically connected to the second control circuit to each other, for detecting the hydraulic pressure for calculating the braking force to be generated, and the signal line for electrically connecting the first control circuit and the second control circuit, for communication of the detection value of the hydraulic-pressure sensor. The second control circuit determines whether or not there is an abnormality in the hydraulic-pressure sensor in the predetermined first cycle based on the detection value of the hydraulic-pressure sensor, determines whether or not there is an abnormality in the circuits other than the hydraulic-pressure sensor in the second cycle shorter than the predetermined first cycle, and outputs the abnormality signal to the first control circuit via the signal line when the occurrence of the abnormality is determined. The first control circuit receives the detection value of the hydraulic-pressure sensor through the communication from the second control circuit via the signal line, and determines whether or not there is an abnormality in the hydraulic-pressure sensor in the second cycle based on the detection signal received through the communication. The first control circuit controls the first braking mechanism based on the braking command to the first braking mechanism (without using the detection value of the hydraulic-pressure sensor) when detecting the occurrence of the abnormality in the hydraulic-pressure sensor and determines occurrence of a failure of the hydraulic-pressure sensor or the second control circuit is faulty when receiving the abnormality signal from the second control circuit via the signal line.

The embodiments described above encompass the following concept. Specifically, the control mechanism for a target to be driven (brake) includes the first control mechanism (master-cylinder pressure control mechanism) and the second control mechanism (wheel-cylinder pressure control mechanism) for controlling a driving source for driving the target to be driven, the physical-quantity detector (hydraulic-pressure sensor) for detecting a physical quantity of the driving source, the first control device (first ECU) for inputting the signal from the physical-quantity detector to control the first control mechanism, the second control device (second ECU) for inputting the signal from the physical-quantity detector to control the second control mechanism, the first diagnosis function (preceding determination) provided to the first control device, for diagnosing the physical-quantity detector, and the second diagnosis function (abnormality determination) provided to the second control device, for diagnosing the physical-quantity detector. The first diagnosis function and the second diagnosis function make a diagnosis based on different diagnosis criteria (first cycle T1, second cycle T2, abnormality threshold value α, and abnormality threshold value α1).

According to one embodiment, the second control circuit can determine whether or not there is an abnormality in the detection device by comparing the detection value of the detection device with a predetermined threshold value. The first control circuit can determine whether or not there is an abnormality in the detection device by comparing the detection value of the detection device, which is received through communication via the signal line, with another threshold value different from the predetermined threshold value of the second control circuit.

According to one embodiment, it is possible to provide the vehicle control apparatus and the brake control apparatus, which enable determination of whether or not there is an abnormality in the detection device to be individually performed by two control circuits, to thereby ensure reliability of control of each control circuit.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

What is claimed is:

1. A brake control apparatus, comprising:
a first control unit configured to control a first braking mechanism for generating a braking force for a vehicle;
a second control unit configured to control a second braking mechanism for generating a braking force for the vehicle in cooperation with or independently of the first braking mechanism;
a hydraulic-pressure sensor configured to be electrically connected to the second control unit, and configured to detect a hydraulic pressure for calculating a braking force to be generated; and
a signal line configured to electrically connect the first control unit and the second control unit to each other so as to allow communication of a detection signal corresponding to a detection value of the hydraulic-pressure sensor, wherein:
the second control unit is configured to determine whether the hydraulic-pressure sensor is abnormal or not based on the detection value of the hydraulic-pressure sensor; and
the first control unit is configured to:
receive the detection signal corresponding to the detection value of the hydraulic-pressure sensor through communication from the second control unit via the signal line,
determine whether the hydraulic-pressure sensor is abnormal or not based on the detection signal corresponding to the detection value of the hydraulic-pressure sensor and received through the communication, and
make the determination whether the hydraulic-pressure sensor is abnormal or not based on the detection signal corresponding to the detection value of the hydraulic-pressure sensor at a time earlier than a time at which the second control unit determines whether the hydraulic-pressure sensor is abnormal or not based on the detection value of the hydraulic-pressure sensor, control the first braking mechanism based on both a braking command to the first braking mechanism and the detection signal corresponding to the detection value of the hydraulic-pressure sensor, when the hydraulic-pressure sensor is determined not to be abnormal by any one of the first control unit and the second control unit, stop the control of the first braking mechanism based on both the braking command to the first braking mechanism and the detection signal corresponding to the detection value of the hydraulic-pressure sensor, when the hydraulic-pressure sensor is determined to be abnormal by any one of the first control unit and the second control unit, and control the first braking mechanism based on the braking command without using the detection signal corresponding to the detection value of the hydraulic-pressure sensor.

2. A brake control apparatus according to claim 1, wherein:
the first control unit and the second control unit are configured to independently perform processing after the hydraulic-pressure sensor is determined to be abnormal; and
the second control unit is configured to:
communicate to and from the first control unit via the signal line, and
transmit a result of the determination of whether or not the hydraulic-pressure sensor is abnormal to the first control unit via the signal line.

3. A brake control apparatus according to claim 1, wherein the first control unit is configured not to make a notification of the hydraulic-pressure sensor abnormality when the first control unit determines that the hydraulic-pressure sensor is abnormal, and the second control unit is configured to make the notification of the hydraulic-pressure sensor abnormality when the second control unit determines that the hydraulic-pressure sensor is abnormal.

4. A brake control apparatus according to claim 1, wherein the first control unit and the second control unit are configured to communicate a result of the determination of whether the hydraulic-pressure sensor is abnormal or not with each other via the signal line to perform processing independently of each other after the hydraulic-pressure sensor is determined to be abnormal.

5. A brake control apparatus, comprising:
a first control unit configured to control a first braking mechanism for generating a braking force for a vehicle;
a second control unit configured to control a second braking mechanism for generating a braking force for the vehicle in cooperation with or independently of the first braking mechanism;
a hydraulic-pressure sensor configured to be electrically connected to the second control unit, and configured to detect a hydraulic pressure for calculating a braking force to be generated; and
a signal line configured to electrically connect the first control unit and the second control unit to each other so as to allow communication of a detection signal corresponding to a detection value of the hydraulic-pressure sensor, wherein:
the second control unit is configured to:

determine whether or not there is an abnormality in the hydraulic-pressure sensor in a predetermined first cycle based on the detection value of the hydraulic-pressure sensor, determine whether or not there is an abnormality in a unit that is in the second control unit and that is other than the hydraulic-pressure sensor in a second cycle shorter than the predetermined first cycle, and output an abnormality signal to the first control unit via the signal line when determining that there is the abnormality in the hydraulic-pressure sensor or the unit that is in the second control unit and that is other than the hydraulic-pressure sensor; and the first control unit is configured to:
receive the detection signal corresponding to the detection value of the hydraulic-pressure sensor through communication from the second control unit via the signal line, determine whether or not there is the abnormality in the hydraulic-pressure sensor in the second cycle based on the detection signal corresponding to the detection value of the hydraulic-pressure sensor received through the communication, control the first braking mechanism based on a braking command to the first braking mechanism when determining that there is the abnormality in the hydraulic-pressure sensor, and finally determine an occurrence of a failure of any one of the hydraulic-pressure sensor and the second control unit when the abnormality signal is received from the second control unit via the signal line, control the first braking mechanism based on both a braking command to the first braking mechanism and the detection signal corresponding to the detection value of the hydraulic-pressure sensor, when no abnormality in the hydraulic-pressure sensor is determined by any one of the first control unit and the second control unit, stop the control of the first braking mechanism based on both the braking command to the first braking mechanism and the detection signal corresponding to the detection value of the hydraulic-pressure sensor, when the hydraulic-pressure sensor is determined to be abnormal by any one of the first control unit and the second control unit, and control the first braking mechanism based on the braking command without using the detection signal corresponding to the detection value of the hydraulic-pressure sensor.

6. A vehicle control apparatus, comprising:
a first control unit configured to control a first braking mechanism for a vehicle;
a second control unit configured to control a second braking mechanism for the vehicle;
a detection device configured to be electrically connected to the second control unit, and configured to detect a state of the vehicle; and
a signal line configured to electrically connect the first control unit and the second control unit to each other so as to allow communication of a detection signal corresponding to a detection value of the detection device, wherein:
the second control unit is configured to determine whether or not there is an abnormality in the detection device by a predetermined criterion based on the detection value of the detection device; and
the first control unit is configured to:

receive the detection signal corresponding to the detection value of the detection device through communication from the second control unit via the signal line, and determine whether or not there is the abnormality in the detection device by another criterion for the detection value different from the predetermined criterion of the second control unit, based on the detection signal corresponding to the detection value of the detection device received through the communication, control the first braking mechanism based on both a braking command to the first braking mechanism and the detection signal corresponding to the detection value of the detection device, when no abnormality in the detection device is determined by any one of the first control unit and the second control unit, stop the control of the first braking mechanism based on both the braking command to the first braking mechanism and the detection signal corresponding to the detection value of the detection device, when occurrence of the abnormality in the detection device is determined by any one of the first control unit and the second control unit, and control the first braking mechanism based on the braking command without using the detection signal corresponding to the detection value of the detection device.

7. A vehicle control apparatus according to claim 6, wherein:
the first control unit and the second control unit are configured to independently perform processing after the determination that there is the abnormality in the detection device; and
the second control unit is configured to:
communicate to and from the first control unit via the signal line, and
transmit a result of the determination of whether or not there is the abnormality in the detection device to the first control unit via the signal line.

8. A vehicle control apparatus according to claim 6, wherein the first control unit is configured not to make a notification of the abnormality in the detection device when the first control unit determines that there is the abnormality in the detection device, and the second control unit is configured to make the notification of the abnormality in the detection device when the second control unit determines that there is the abnormality in the detection device.

9. A vehicle control apparatus according to claim 6, wherein the first control unit and the second control unit are configured to communicate a result of the determination of whether or not there is the abnormality in the detection device with each other via the signal line to perform processing independently of each other after the determination that there is the abnormality in the detection device.

10. A first control unit, wherein the first control unit is configured to be electrically connected to a first braking mechanism for generating a braking force for a vehicle and configured to control the first braking mechanism, the first control unit comprising:
a circuit being connected to a second control unit, the second control unit being electrically connected to a hydraulic-pressure sensor configured to detect a hydraulic pressure for calculating a braking force to be generated by the first braking mechanism,
the second control unit being configured to control a second braking mechanism for generating a braking force for the vehicle in cooperation with or independently of the first braking mechanism,
the second control unit being further configured to determine whether the hydraulic-pressure sensor is abnormal or not based on a detection value of the hydraulic-pressure sensor; and
the first control unit being further configured to:
receive a detection signal corresponding to the detection value of the hydraulic-pressure sensor from the second control unit,
determine whether the hydraulic-pressure sensor is abnormal or not based on the detection signal corresponding to the detection value of the hydraulic-pressure sensor received from the second control unit, and
make the determination whether the hydraulic-pressure sensor is abnormal or not based on the detection signal corresponding to the detection value of the hydraulic-pressure sensor at a time earlier than a time at which the second control unit determines whether the hydraulic-pressure sensor is abnormal or not based on the detection value of the hydraulic-pressure sensor,
control the first braking mechanism based on both a braking command to the first braking mechanism and the detection signal corresponding to the detection value of the hydraulic-pressure sensor, when no abnormality in the hydraulic-pressure sensor is determined by any one of the first control unit and the second control unit,
stop the control of the first braking mechanism based on both the braking command to the first braking mechanism and the detection signal corresponding to the detection value of the hydraulic-pressure sensor, when occurrence of the abnormality in the hydraulic-pressure sensor is determined by any one of the first control unit and the second control unit, and
control the first braking mechanism based on the braking command without using the detection signal corresponding to the detection value of the hydraulic-pressure sensor.

11. A first control unit, wherein the first control unit is configured to be electrically connected to a first mechanism of a vehicle and configured to control the first mechanism, the first control unit comprising:
a circuit being connected to a second control unit, the second control unit being electrically connected to a detection device configured to detect a state of the vehicle,
the second control unit being configured to control a second mechanism of the vehicle separately from the first mechanism,
the second control unit being further configured to determine whether the detection device is abnormal or not by a predetermined criterion based on a detection value received from the detection device; and
the first control unit being further configured to:
receive a detection signal corresponding to the detection value of the detection device from the second control unit, and
determine whether the detection device is abnormal or not by another criterion different from the predetermined criterion of the second control unit based on the detection signal corresponding to the detection value of the detection device received from the second control unit,
control the first mechanism based on both a control command to the first mechanism and the detection signal corresponding to the detection value of the detection device, when no abnormality in the detection device is determined by any one of the first control unit and the second control unit, stop the control of the first mechanism based on both the control command to the first mechanism and the detection signal corresponding to the detection value of the detection device, when occurrence of the abnormality in the detection device is determined by any one of the first control unit and the second control unit, and control the first mechanism based on the braking command without using the detection signal corresponding to the detection value of the detection device.

12. A brake control apparatus, comprising:
a first control unit configured to control a first braking mechanism for generating a braking force for a vehicle;
a second control unit configured to control a second braking mechanism for generating a braking force for the vehicle in cooperation with or independently of the first braking mechanism;
a hydraulic-pressure sensor configured to be electrically connected to the second control unit, and configured to detect a hydraulic pressure for calculating a braking force to be generated; and
a signal line configured to electrically connect the first control unit and the second control unit to each other so as to allow communication of a detection signal corresponding to a detection value of the hydraulic-pressure sensor, wherein:
the second control unit is configured to determine whether the hydraulic-pressure sensor is abnormal or not based on the detection value of the hydraulic-pressure sensor; and
the first control unit is configured to:
receive the detection signal corresponding to the detection value of the hydraulic-pressure sensor through communication from the second control unit via the signal line,
determine whether the hydraulic-pressure sensor is abnormal or not based on the detection signal corresponding to the detection value of the hydraulic-pressure sensor and received through the communication, and
make the determination whether the hydraulic-pressure sensor is abnormal or not based on the detection signal corresponding to the detection value of the hydraulic-pressure sensor at a time earlier than a time at which the second control unit determines whether the hydraulic-pressure sensor is abnormal or not based on the detection value of the hydraulic-pressure sensor,
perform a feedback control of the first braking mechanism based on both a braking command to the first braking mechanism and the detection signal corresponding to the detection value of the hydraulic-pressure sensor, while monitoring the detection signal corresponding to the detection value of the hydraulic-pressure sensor, when the hydraulic-pressure sensor is determined not to be abnormal, and
stop the feedback control of the first braking mechanism based on both the braking command to the first braking mechanism and the detection signal corresponding to the detection value of the hydraulic-pressure sensor, and
control the first braking mechanism based on the braking command without using the detection signal corresponding to the detection value of the hydraulic-pressure sensor, when the hydraulic-pressure sensor is determined to be abnormal.

13. A brake control apparatus according to claim 12, wherein the second control unit is configured to finally determine a failure of the hydraulic-pressure sensor when the hydraulic-pressure sensor is determined to be abnormal.

* * * * *